United States Patent Office 2,957,909
Patented Oct. 25, 1960

2,957,909

PROCESS FOR THE PREPARATION OF NEW ANILINE-DISULPHONIC ACID CHLORIDE DERIVATIVES

Rezsö König and Zoltán Földi, Budapest, Hungary, assignors to Chinoin Gyogyszer- es Vegyeszeti Termekek Gyara Rt., Budapest, Hungary No Drawing. Filed Oct. 6, 1959, Ser. No. 844,643

Claims priority, application Hungary Feb. 17, 1959

5 Claims. (Cl. 260—543)

This invention relates to N-(α-alkoxy-alkyl)-3-chloro-aniline-4,6-disulphonic acid chlorides which are new compounds and to methods for preparing the same.

It is known, that 3-chloro-aniline-4,6-disulphonic acid chloride may be used as a starting material for the preparation of pharmaceuticals, e.g. of diuretics.

We have found, that these N-(α-alkoxy-alkyl)-aniline-4,6-disulphonic acid chlorides are valuable intermediates for the preparation of pharmaceuticals, e.g. diuretics.

The new compounds have the following general formula

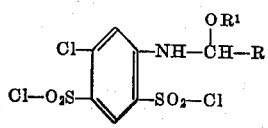

where R means hydrogen or a lower alkyl group and $R^1$ means an alkyl group.

The compound of the formula

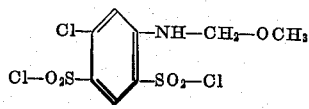

has been found especially suitable to be used for preparing diuretics.

The new compounds are prepared by reacting 1-amino-3-chloro-4,6-benzene-disulphonic acid chloride with an α-chloro-ether. The general formula of the α-chloro-ether is the following:

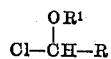

where $R^1$ and R have the same meaning as above. Such ethers are e.g. (α-chloro-ethyl)-methyl ether, (α-chloro-ethyl)-ethyl ether. It is especially advantageous to use a chloro-methyl-alkyl ether, for instance monochloro-methyl-methyl ether.

It is advantageous to carry out the reaction at a temperature not exceeding room temperature in acetone as medium.

The reaction mixture may be worked up by several ways. When the reaction product crystallizes out it may be obtained by filtration, when no crystallization occurs it is preferable to remove the solvent in vacuo.

The abovementioned methods may be applied, however, in combination, as well.

Further details of the process are to be found in the examples.

*Example 1.*—To 9.75 g. of 3-chloro-aniline-4,6-disulphonic acid chloride 6 ml. of dry acetone and 3 ml. of monochlorodimethylether are added. Soon a solution results, then crystallization sets in. The reaction mixture is left for overnight. The thick crystalline pulp is brought under reduced pressure to dryness. About 11 g. of crystals remain. The crystals are triturated with 9 ml. of ice cold chloroform, filtered with suction and washed with chloroform. 10.1 g. of the N-(methoxymethyl)-derivative of 3-chloro-aniline - 4,6 - disulphonic acid chloride are obtained, it melts in this state of purity at about 154° C. with decomposition. This product is of practical purity. Instead of trituration with chloroform other solvents e.g. benzene, may be likewise used; treatment with such solvents is however not always necessary. For purification 1 g. of the product may be recrystallized from 12 ml. of anhydrous benzene. The product thus obtained, melts at 165° C. (decomposition). The chlorine content (Carius) found was 29.03% and 29.15% (the theoretical value being 28.95%).

*Example 2.*—To 19.5 g. of 3-chloro-aniline-4,6-disulphonic acid chloride 12 ml. of anhydrous acetone and 5.4 ml. of freshly distilled monochloro dimethyl ether are added while cooling with ice, and shaken at room temperature. The reaction mixture gives soon a solution; on inoculation crystallization sets in. The mixture is kept for 2 hours at room temperature, then cooled in a cooling mixture. The crystals are brought on a suction filter, and washed with 3×3 ml. and 3×2 ml. portions of anhydrous acetone, cooled previously in a cooling mixture. On drying in vacuo at 40° C., 18.1 g. of the N-methoxymethyl derivative of 3-chloro-aniline-4,6-disulphonic acid chloride are obtained in form of white crystals, melting in this state of purity at 162° C. with decomposition.

On evaporation of the acetone mother liquors further amounts of the product may be obtained.

What we claim is:

1. New aniline disulphonic acid chloride derivatives of the formula

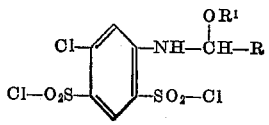

where R is a member of the group consisting of hydrogen and lower alkyl and $R^1$ is alkyl.

2. New aniline disulphonic acid chloride derivative of the formula

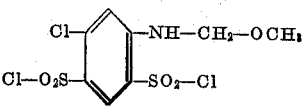

3. A process for preparing an aniline-disulphonic acid chloride compound comprising contacting 1-amino-3-chloro-benzene-4,6-disulphonic acid chloride with an α-chloro-ether.

4. A process for preparing an aniline-disulphonic acid chloride compound comprising contacting 1-amino-3-chloro-benzene-4,6-disulphonic acid chloride with monochloro dimethyl ether.

5. A process for preparing an aniline-disulphonic acid chloride compound comprising contacting 1-amino-3-chloro-benzene-4,6-disulphonic acid chloride with monochloro dimethyl ether at a temperature not exceeding room temperature in acetone as a solvent.

No references cited.